United States Patent

[11] 3,612,544

| [72] | Inventors | Peter Muller;<br>Werner Schroder; Rudolf Prescher, all of Essen, Germany |
|---|---|---|
| [21] | Appl. No. | 881,514 |
| [22] | Filed | Dec. 2, 1969 |
| [45] | Patented | Oct. 12, 1971 |
| [73] | Assignee | Fried Krupp Gesellschaft mit beschrankter Haftung<br>Essen, Germany |
| [32] | Priority | Dec. 13, 1968 |
| [33] | | Germany |
| [31] | | P 18 14 501.2 |

[54] TORQUE RESPONSIVE FLEXIBLE SEALING RING
6 Claims, 8 Drawing Figs.

[52] U.S. Cl. ..................................................... 277/25, 277/27
[51] Int. Cl. .......................................... F16j 15/40
[50] Field of Search ............................................ 277/3, 25, 27, 83

[56] References Cited
UNITED STATES PATENTS

| 2,538,422 | 1/1951 | Kollsman | 277/27 |
| 3,347,552 | 10/1967 | Frisch | 277/27 |
| 3,499,653 | 3/1970 | Gardner | 277/27 |

*Primary Examiner*—Robert I. Smith
*Attorney*—Walter Becker

ABSTRACT: A sealing structure for use between two structural members movable relative to each other and including a ring-formed elastically twistable sealing member therebetween, in response to pressure drop being pressed into sealing contact with one of the structural members. Projecting means are provided on one structural member relative to which the sealing member is thereby prevented form rotative movement in a direction transverse to pressure drop. Between the ring-formed elastically twistable sealing member and one structural member there is a first intermediate space closed against an adjoining surface and on the other hand open toward higher pressure. Between the ring-formed elastically twistable sealing member and another structural member there is a second intermediate space on the one hand joined to a narrow gap formation between the sealing member and the first structural member and on the other hand open toward higher pressure. In response to pressure built up in the gap due to dynamic impact pressure against damming means or strips while the first and second structural members move relative to each other, there occurs change of the gap so as to transform it into a wedge-shaped gap widening toward the side of higher pressure. The sealing member with narrow gap space surrounds the first structural member formed by a shaft and becomes pressed in axial direction against adjoining surface location of a second structural member by way of higher pressure prevailing in a first intermediate space.

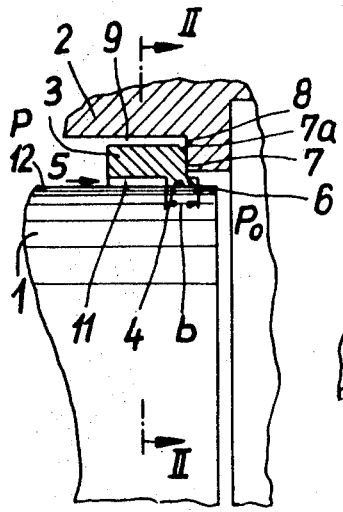
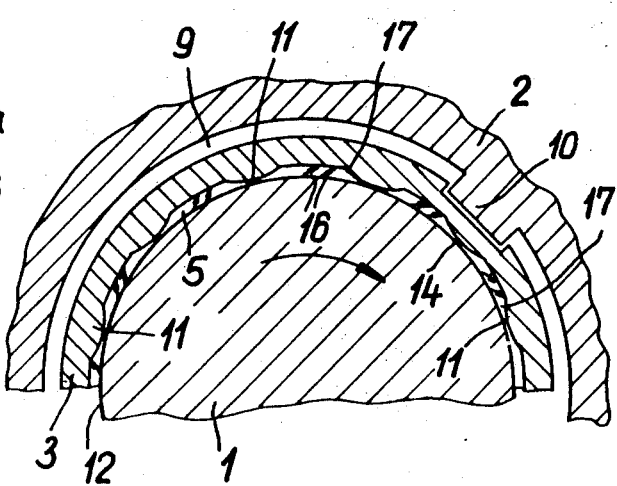
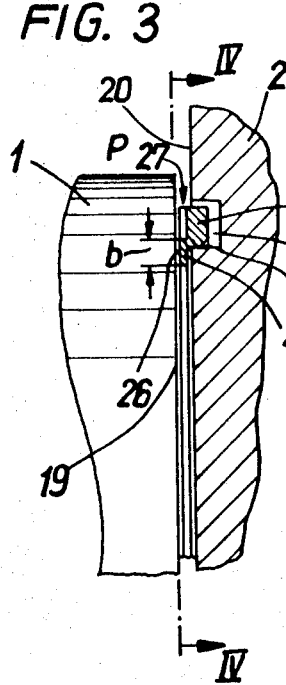
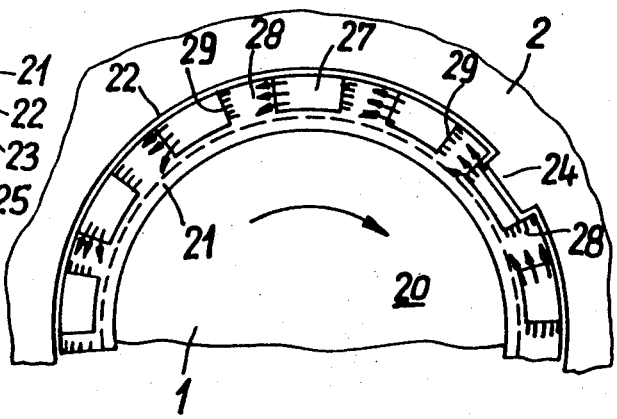

Inventors:
Peter Müller
Werner Schröder
Rudolf Prescher

TORQUE RESPONSIVE FLEXIBLE SEALING RING

The present invention relates to a sealing arrangement. With heretofore known slide ring seals, a metallic ring mounted on one of two structural elements movable relative to each other and sealed relative to the said one structural element, for instance, by an O-ring is by means of the higher pressure relative to which the seal is to be effected and, if desired, additionally by a spring pressed against a surface of the other structural element. However, the employment of such slide ring seals limited. This is due to the fact that if a seal is to be effected at high sliding speeds against very high pressures, the metallic contact occurring between the sealing surface of the slide ring and the counter surface will for reasons of wear generally no longer be admissible. In such instances, the attempt has been made to relieve the seal by providing in various manners a liquid seal between the surfaces moving relative to each other.

Thus, for instance, to this end a hydrostatic relief of the seal has been provided. In this connection, that surface of the sealing element which is subjected to the higher pressure for the closing of the seal is smaller than the sealing surface of the sealing element in the sealing gap. However, such an arrangement does not yield a sufficient safety of operation because the curve of the pressure within the sealing gap cannot be precisely determined.

Therefore, seals with hydrodynamic relief have been developed. Thus, for instance, between an end face of a shaft and an annular sealing element subjected in axial direction to a higher pressure, a closed lubricating film is produced by arranging the sealing element eccentrically with regard to the shaft or by providing the circumference of the sealing element with notches. In this way a tangential drag flow forms inasmuch as certain parts of the end face of the shaft which are first moistened by the pressure medium outside the sealing element pass in view of the rotary movement below the sealing element thereby causing an accumulating edge effect.

Another possibility of hydrodynamically relieving the seal consists in narrowing the sealing gap in the direction of the pressure drop by a certain design of the sealing surface of the sealing element, for instance, by selecting a conical or stepped shape. With this arrangement a leakage flow will be admitted, and the pressure decreases in the gap at a lower rate than a linear rate. This is the case all the more the more the sealing element under the influence of the higher pressure approaches the counter surface so that to an increasing extent the higher pressure will be countered. Such leakage relieving gap seals are also known in cases in which the relative movement between the two structural elements is effected in the same direction as the pressure drop against which the seal is to be effected.

It is, therefore, an object of the present invention to provide an improved seal without undesired wear.

This object and other objects and advantages of the invention will appear more clearly from the following specification in connection with the accompanying drawings, in which:

FIG. 1 illustrates in section a sealing construction according to the present invention.

FIG. 2 represents a section taken along the line II — II of FIG. 1.

FIG. 3 represents a section similar to that of FIG. 1 but of a modified sealing construction according to the invention.

FIG. 4 is a section taken along the line IV—IV of FIG. 3.

Figure 7:
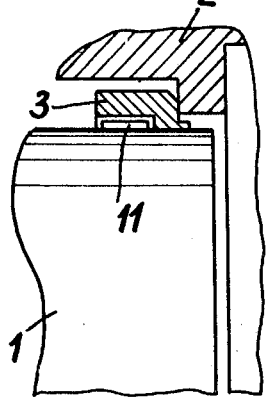
Figure 8:
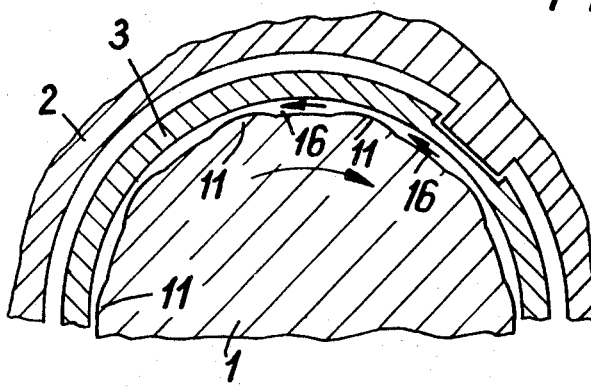

FIGS. 7 and 8 illustrate a modified arrangement differing from that of FIGS. 1 and 2 in that the protruding strips 11 are mounted on the shaft rather than on the sealing ring.

The present invention is based on a sealing construction between two structural elements which move relative to each other in a direction transverse to the pressure drop against which the seal is to be effected while the higher pressure acts upon the sealing element which is tightly connected to one of the structural elements and at said higher pressure acts in such a way that it tends to bring a sealing surface of the sealing element into sealing engagement with a counter surface of the other structural element by means of a lubricating film forming in the gap between the sealing surface and the counter surface, the relief being effected hydrodynamically.

The invention is characterized primarily in that adjacent the gap between the sealing surface and the counter surface within a narrow intermediate space open toward the higher pressure between the sealing element and the counter element there are provided protruding strip portions which extend transverse to the relative movement of the sealing element and the counter surface and form a part of the sealing element or the other structural element. These strips have such a profile that the damming-up pressure which forms during the relative movement at the protruding strip portions widens the gap in a wedge-shaped manner toward the side of the higher pressure.

A sealing construction according to the present invention may, for instance, be so designed that an annular member forming the sealing element and being elastically deformable rests in axial direction against the structural element to which it is sealingly connected and together with a shaft comprising the counter surface forms a narrow space and within said space is provided with protruding strip portions. However, it is also possible that an annular member which is elastically deformable and forms the sealing element rests in radial direction against the structural element to which it is sealingly connected and with an end face of the other structural element forming the counter surface forms the narrow gap while within said gap being provided with the protruding strip portions.

Referring now the drawings in detail, the arrangement shown in FIG. 1 comprises a shaft 1 and a housing 2 surrounding said shaft 1. A sealing ring 3, for instance of steel, has a cylindrical sealing surface 4 with a width $b$. The sealing ring 3 surrounds shaft 1. Between the sealing ring 3 and shaft 1 adjacent to the sealing surface 4 there is provided an annular gap 5 which is open toward the higher pressure $p$.

At the side of the lower pressure $po$, the sealing ring 3 has a lip 6 which protrudes beyond the end face 7 of the sealing ring, said end face being plane. Of this end face in the starting position of the sealing ring according to FIGS. 1 and 5, only one part, namely an annular surface of the width $c$, engages a vertical surface 8 of the housing 2. On one hand, the surface 8 does not extend to the lip 6 and on the other hand the end face 7 does not extend to the circumference of the sealing ring 3 but instead a conical surface 7a is formed adjacent the end face 7 by slanting the sealing ring profile. This conical surface 7a together with the surface 8 forms an annular gap which increases toward the circumference of the sealing ring and in which the higher pressure $p$ prevails. The annular gap between the surfaces 7a and 8 transforms into a ring-formed or annular intermediate space or gap 9 between the structural member 2 and the sealing member 3 and this intermediate space or gap 9 is open toward the higher pressure P. Consequently, within the gap of the width $c$, the pressure drops linearly from $p$ to $po$. Assuming for simplifying purposes that $po$ equals zero, the force which corresponds to this pressure drop which force tends to lift the sealing ring 3 in axial direction off the surface 8 is represented by the shaded triangular surface $F_1$ in FIG. 5. The pressure $p$ acting upon the sealing ring 3 along an annular surface is directed in a direction opposite to said force. The outer radius of said annular surface equals the outer radius of the end face 7. The said annular surface is delimited toward the axis of shaft 1 by the circumferential surface thereof. The force resulting therefrom is represented by the shaded rectangular surface $F_2$ in FIG. 5. Since this force considerably exceeds the force corresponding to the surface $F_1$, the sealing ring 3 is by the corresponding differential force pressed against the surface 8 so that a good seal will be realized between the sealing ring 3 and the housing 2. It is assumed that shaft 1 rotates in the direction of the arrow indicated in FIG. 2. The sealing ring 3 is by means of a projecting means or nose 10 of the housing, which engages a recess of the sealing ring 3, prevented from taking part in the rotary movement of the shaft 1.

According to the present invention, within the gap 5 and on the sealing ring 3 there are provided protruding strips 11 evenly distributed over the circumference. These strips extend in axial direction which means transverse to the rotary movement of the shaft 1.

Figure 5:
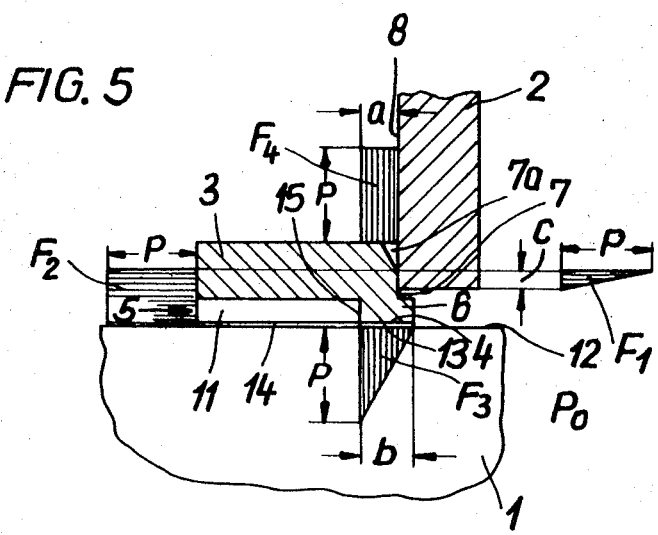
FIGS. 5 and 6 illustrate on a larger scale than FIG. 1 portions thereof while indicating the forces acting upon the seal.

As illustrated in FIG. 5, in the starting position of the sealing ring 3, when shaft 1 does not rotate, between the sealing surface 4 and the circumferential surface 12 of shaft 1 which forms a counter surface, there exists a narrow gap 13. Furthermore, narrow gaps 14 also exist between the strips 11 and the counter surface 12.

In the starting position according to FIG. 5, the higher pressure $p$ prevails in the gap 5. The radially outwardly directed effect of the higher pressure $p$ upon the sealing ring 3 is fully equalized by the radially inwardly directed effect of the pressure $p$ acting upon the circumference of the sealing ring 3 over the width of the gap 5. Inasmuch as the narrow gap 13 is of equal width over the length $b$, the pressure will within this gap decrease linearly from the pressure $p$ to the lower pressure $po$. Assuming that $po$ equals zero, the course of the pressure in FIG. 5 is represented within the gap 13 by the shaded triangular surface $F_3$.

The higher pressure $p$ is directed against the pressure in gap 13 which last mentioned pressure acts upon the sealing ring 3 in radial outward direction. This applies as far as the higher pressure $p$, acts upon the circumferential surface of the sealing ring between the end face 7 and that vertical plane 15 which forms the step between the gap 13 and the space 5. The pressure thus acting upon the annular surface of the width $a$ is indicated in FIG. 5 by the shaded rectangular surface $F_4$.

The difference between the pressure forces acting over the width $a$ and of the pressure prevailing in gap 13 results in the closing pressure. This closing pressure therefore equals $p \times a - 1/2 p \cdot b$.

Figure 6:
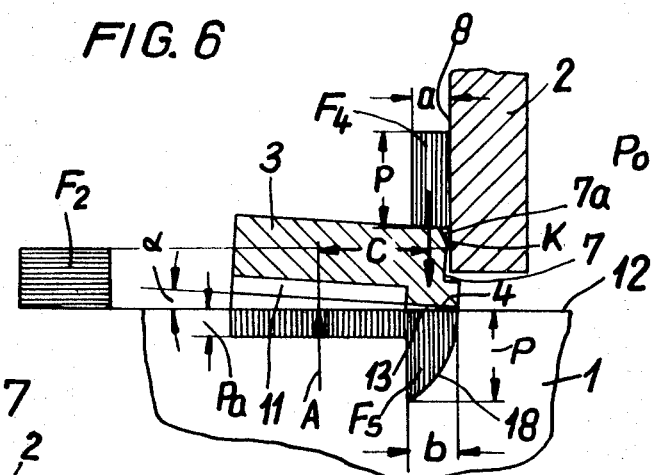

When shaft 1 rotates, the liquid which in housing 2 is under the pressure $p$ is carried along to a certain extent within the spaces into which the space 5 is subdivided by the strips 11. The liquid being carried along is as indicated in FIG. 2 by the arrow 16 pressed against the respective flanks 17. These flanks extend at an angle with regard to the circumferential movement of shaft 1 with a slightly convexly curved profile. Consequently, the liquid carried along by the circumferential surface 12 of shaft 1 is pressed into the narrow gaps 14 between the strips 17 and shaft 1. As a result thereof, below the strips 11 a pressure $p_a$ forms (FIG. 6). Forces A resulting therefrom exert a twisting moment with a lever arm $c$ upon the sealing ring 3 which is elastically deformable. Consequently, the gap 13 is as shown in FIG. 6 narrowed in the manner of a wedge. This wedge angle is designated with the letter $\alpha$. The inherent inclined position of the strip profile is made possible by the conical surface 7$a$. The sealing ring 3 engages the surface 8 only along a circular line K and, more specifically, due to the axial force which corresponds to the shaded rectangular surface $F_2$. The wedge-shaped narrowing of the gap 13 brings about that the pressure in gap 13 no longer drops i a linear manner but drops slower, approximately in conformity with the parabolalike curve 18 shown in FIG. 6. Consequently, the force acting radially outwardly upon the sealing ring 3 which force is indicated by the surface $F_5$ is greater than at the starting position according to FIG. 5 in conformity with the surface $F_3$. Accordingly, the difference of the radially inwardly directed force $p \times a$ and the force acting in the gap 13 and expressed by $$\int_0^b p \times db$$

is less than before. Therefore, the closing force is reduced by the twisting effect of the sealing ring 3 brought about by the strips 11. This closing force becomes zero if by a further twisting of the sealing ring and by a correspondingly further narrowing of the gap 13 the pressure in this gap is dammed up to such an extent that the resultant of this pressure balances the force $p \times a$. It will be obvious that in this way a seal is obtained with a minimum of leakage losses without any material metallic contact between the sealing ring 3 and shaft 1. The same result is realized also at very high pressures $p$ and very high circumferential speeds of shaft 1.

According to the embodiment of FIGS. 3 and 4, the seal is effected between an end face 19 of a rotary shaft 1 and a vertical surface 30 of the housing 2 which last mentioned surface is located opposite to and slightly spaced from the end face 19. The sealing ring 21 is located in an annular groove of housing 2 and is by means of the higher pressure $p$ in radial direction with a cylindrical inner surface 23 pressed against the inner surface of the annular groove 22. The sealing ring 21 is likewise by a projecting means or nose 24 of housing 2 prevented from rotation, the nose engaging a recess at the circumference of the sealing ring. The sealing surface 25 is located in a vertical plane which together with the end face 19 of shaft 1 forms a narrow gap 26. The width of said sealing surface 25 is again designated with the letter $b$. Adjacent said gap 26 between the sealing ring 25 and the end face 19 there is provided an intermediate space 27 which is open toward the higher pressure $p$. Within said last mentioned space and on the sealing ring 21 there are provided strips 28 which extend in radial direction and have a profile similar to that of the strips 11 according to FIG. 2.

When shaft 1 rotates in the direction indicated by the arrow in FIG. 4, in the space 27 at the respective flanks 29 of the strips, accumulation of the liquid carried along by the end face 19 occurs. As a result thereof, fundamentally in the same manner as with the embodiment of FIGS. 1 and 2, according to FIG. 6 the sealing ring 21 is so twisted that the gap 26 will narrow in a wedge-shaped manner.

As will be seen from the above, the seal according to the present invention represents a considerable advance in the prior art in various respects, namely:
1. Gap reductions are produced as they could be obtained with heretofore known rigid sealing elements only by very difficult manufacturing processes.
2. These gap reductions are not affected by wear because they are not worked into the sealing surface of the sealing element but are formed only while in operation on normal plane or cylindrical surfaces.
3. The drawbacks heretofore encountered with rigid sealing elements due to the changes in the sealing surfaces in view of thermal and other distortions are eliminated because the sealing element according to the invention aligns itself along the counter surface which is made possible with annular designs of the sealing element in view of the elastic deformability.
4. The gap reductions are with a sealing construction according to the invention so minor that a satisfactory seal is obtained which with heretofore known sealing elements could not be realized without the danger of seizing between the sealing surfaces.

It is, of course, to be understood that the present invention is, by no means, limited to the particular showing in the drawings but also comprises any modifications within the scope of the appended claims.

What we claim is:
1. A sealing structure which includes: a first structural member and a second structural member movable relative to each other in a direction transverse to the pressure drop against which the seal is to be effected, and a ring-formed elastically twistable sealing member interposed between said structural members and in response to pressure drop being pressed into sealing contact with one of said structural members while forming a sealing gap with the other structural member, projecting means on said first structural member relative to which said sealing member is thereby prevented from rotative movement in a direction transverse to pressure drop, and flow restricting damming means formed in at least one of the opposed surfaces of said sealing member and said second of said structural members, and said damming means being spaced radially inwardly from the sealing contact of said ring-formed sealing member with one of said structural members and spaced from the gap while extending in a direction transverse to the direction of movement of said structural members relative to each other, said damming means being operable with said sealing member in response to pressure built up in said gap while said first and second structural members move relative to each other to change said gap so as to transform it into a wedge-shaped gap widening toward the side of the higher pressure.

2. A sealing structure according to claim 1, in which said sealing member is an elastically deformable ring is disposed axially along said first structural member while the other structural member is a cylindrical shaft surface together with said ring.

3. A sealing structure according to claim 1, in which said sealing member is an elastically deformable ring is disposed radially along said first structural member while the other structural member has an end face against which said sealing member abuts.

4. A sealing structure according to claim 1, in which said damming means including enlarged strips provided on one of the members identified as said sealing member and said second structural member, said strips extending substantially the direction of the pressure drop which is transverse to the relative movement between said first and second structural members, said strips having such a profile that dynamic impact pressure arising against said strips during the relative movement between said sealing member and said second structural member causes wedge-formed widening of narrow gap space toward the side of higher pressure.

5. A sealing structure according to claim 4, in which said sealing member is disposed axially between said structural members.

6. A sealing structure according to claim 4, in which said sealing member is disposed radially between said structural members member defines narrow gap space and becomes pressed under higher pressure in the first intermediate space in radial direction against a ring surface of said second structural member located across from a surface of said sealing member.